(12) United States Patent
Cao et al.

(10) Patent No.: US 12,423,362 B2
(45) Date of Patent: Sep. 23, 2025

(54) METHOD FOR TRAINING ISOLATION FOREST, AND METHOD FOR RECOGNIZING WEB CRAWLER

(71) Applicant: BIGO TECHNOLOGY PTE. LTD., Singapore (SG)

(72) Inventors: Ke Cao, Guangzhou (CN); Qinghua Zhong, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 192 days.

(21) Appl. No.: 18/255,843

(22) PCT Filed: Dec. 3, 2021

(86) PCT No.: PCT/CN2021/135229
§ 371 (c)(1),
(2) Date: Jun. 2, 2023

(87) PCT Pub. No.: WO2022/117063
PCT Pub. Date: Jun. 9, 2022

(65) Prior Publication Data
US 2024/0111818 A1    Apr. 4, 2024

(30) Foreign Application Priority Data
Dec. 3, 2020    (CN) .......................... 202011408927.0

(51) Int. Cl.
*G06F 16/951* (2019.01)
*G06F 16/955* (2019.01)
*H04L 9/40* (2022.01)

(52) U.S. Cl.
CPC .......... *G06F 16/951* (2019.01); *G06F 16/955* (2019.01); *H04L 63/0236* (2013.01)

(58) Field of Classification Search
None
See application file for complete search history.

(56) References Cited

U.S. PATENT DOCUMENTS

2015/0058469 A1*    2/2015   Li ........................ H04L 43/08
                                                            709/224
2018/0239825 A1*    8/2018   Tripathi .............. G06F 16/9558
(Continued)

FOREIGN PATENT DOCUMENTS

CN         105187396 A    12/2015
CN         107888616 A     4/2018
(Continued)

OTHER PUBLICATIONS

Extended European Search Report Communication Pursuant to Rule 62 EPC for European Application No. 21900089.0 dated Feb. 13, 2024, which is a foreign counterpart application to this application.
(Continued)

*Primary Examiner* — Thu N Nguyen
(74) *Attorney, Agent, or Firm* — Kolitch Romano Dascenzo Gates LLC

(57) ABSTRACT

A method for training isolation forests includes: acquiring a plurality of categories by classifying uniform resource identifiers; acquiring sample behavior data by monitoring a behavior of a client from each of Internet Protocol IP addresses in a plurality of IP addresses accessing the uniform resource identifiers under the plurality of categories; encoding the sample behavior data as a sample access vector; and training, based on the sample access vector, an isolation forest for recognizing a web crawler from the client.

19 Claims, 5 Drawing Sheets

(56) References Cited

U.S. PATENT DOCUMENTS

2019/0102337 A1    4/2019  Brabec et al.
2019/0394283 A1*  12/2019  Morrison ............ H04L 41/5009
2020/0012886 A1*   1/2020  Walters .................. G06T 7/254

FOREIGN PATENT DOCUMENTS

| CN | 108228864 A | 6/2018 |
| CN | 108985632 A | 12/2018 |
| CN | 109862018 A | 6/2019 |
| CN | 112434208 A | 3/2021 |

OTHER PUBLICATIONS

International Search Report of the International Searching Authority for State Intellectual Property Office of the People's Republic of China in PCT application No. PCT/CN2021/135229 issued on Mar. 2, 2022, which is an international application to which this application claims priority.

\* cited by examiner

METHOD FOR TRAINING ISOLATION FOREST, AND METHOD FOR RECOGNIZING WEB CRAWLER

CROSS-REFERENCE TO RELATED APPLICATION

The present disclosure is a U.S. national phase application of international application No. PCT/CN2021/135229, filed on Dec. 3, 2021, which claims priority to Chinese Patent Application No. 202011408927.0, filed on Dec. 3, 2020, the disclosures of which are herein incorporated by reference in their entireties.

TECHNICAL FIELD

Embodiments of the present disclosure relate to the technical field of safety, for example, to a method for training isolation forests, and a method for recognizing a web crawler.

BACKGROUND OF THE INVENTION

On a network, a large number of pages are published on different types of websites, etc. Users normally access the pages on a client to browse relevant information, such as news, live streams, and short videos.

Besides the users, lawbreakers also access a page using a specific client (i.e., a web crawler, or a web spider)), capture specific information on the page, counterfeit a page development application (APP) of a website, or illegally participate in activities of the website (such as mass use of red envelopes and coupons), or the like, thereby posing security risks to the website.

SUMMARY OF THE INVENTION

Embodiments of the present disclosure provide a method and an apparatus for training isolation forests, and a method and an apparatus for recognizing a web crawler, so as to avoid a condition of low accuracy of recognizing a web crawler through artificially formulated rules.

According to some embodiments of the present disclosure, a method for training isolation forests is provided. The method includes:
  acquiring a plurality of categories by classifying uniform resource identifiers;
  acquiring sample behavior data by monitoring a behavior of a client from each of IP addresses in a plurality of IP addresses accessing uniform resource identifiers under the plurality of categories;
  encoding the sample behavior data as a sample access vector; and
  training, based on the sample access vector, an isolation forest for recognizing a web crawler from the client.

According to some embodiments of the present disclosure, a method for recognizing a web crawler is provided. The method includes:
  acquiring target behavior data by monitoring a behavior of a client from each of IP addresses in a plurality of IP addresses accessing uniform resource identifiers under a plurality of categories;
  encoding the target behavior data as a target access vector;
  determining an isolation forest for recognizing a web crawler from the client, where the isolation forest is acquired by the method for training the isolation forests according to above embodiments;
  recognizing an abnormal IP address by inputting the target access vector into the isolation forest; and
  determining that the client from the abnormal IP address is the web crawler.

According to some embodiments of the present disclosure, a computer device is provided. The computer device includes:
  one or more processors; and
  a memory, configured to store one or more programs, wherein the one or more programs, when loaded and run by the one or more processors, cause the one or more processors to perform the method for training the isolation forests according to the above embodiments or the method for recognizing the web crawler according to the above embodiments.

According to some embodiments of the present disclosure, a non-volatile computer-readable storage medium, storing one or more computer programs, is provided, wherein the one or more computer programs, when loaded and run by a processor, causes the processor to perform the method for training the isolation forests according to the above embodiments or the method for recognizing the web crawler according to the above embodiments.

DETAILED DESCRIPTION

Figure 1:
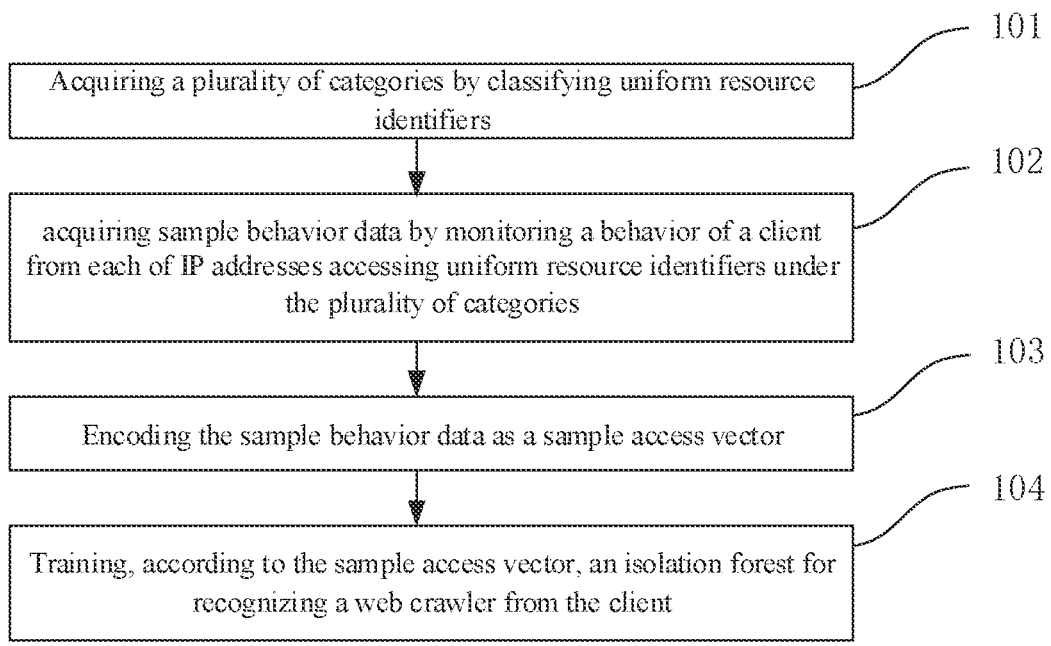
FIG. 1 is a flowchart of a method for training isolation forests according to some embodiments of the present disclosure.

Currently, most websites employ different measures to prevent the web crawler, such as recognizing the web crawler through a user agent (UA), recognizing the web crawler according to an access frequency of an Internet Protocol (IP) address, and recognizing the crawler according to concurrent traffic.

However, these methods are artificially formulated rules and are easily broken by the lawbreakers. For example, collecting a normal UA for the web crawler to use can evade or crack a method of recognizing the web crawler according to the UA, dynamically changing the IP address of the web crawler can evade or crack a method of recognizing the web crawler according to the access frequency of the IP address, the web crawler can break a method of recognizing the crawler through concurrence by using a distributed architecture, and the like. That is, these methods can result in low recognition accuracy of the web crawler and higher safety risk of the website.

The present disclosure will be described in further detail with reference to the drawings and the embodiments. It should be understood that the specific embodiments described herein are merely for the purpose of explaining the present disclosure but not limiting the present disclosure. In addition, it should be further noted that, for the convenience of description, only some of structures associated with the present disclosure are shown in the drawings, not all of them.

FIG. 1 is a flowchart of a method for training isolation forests according to some embodiments of the present disclosure, where the embodiment is applicable to a situation where an isolation forest is trained based on a behavior of a web crawler isolated from a behavior of a user, and the method is executed by an apparatus for training the isolation forests, which is achieved by software and/or hardware, and is configured in a computer device, such as a server, a personal computer, a workstation, including the following steps.

In step 101, uniform resource identifiers are classified to acquire a plurality of categories.

A web crawler is a robot program that automatically browses web content by accessing a uniform resource identifier (URI) according to a specified rule.

The URI locates resources available on a web (Web), such as hypertext markup language (HTML) documents, images, video clips, and programs.

The URI generally consists of three parts:
(1) Naming mechanism of resources;
(2) Hostname of storing resources; and
(3) Name of the resource itself.

It should be noted that the above three parts are just general naming manners of the URI, and anything that uniquely identifies the resource is called URI, and a combination of the above three is a sufficient and unnecessary condition of the URI.

For example, assuming that in a live website, a URI is as follows:
https://*.*cdn.cn/front-publish/home-h5-master/css/h5_4545200.css The resource represented by the URI is cascading style sheets (CSS), the CSS is accessed through a hyper text transfer protocol over secure socket layer (HTTPS) protocol, and the CSS is located on a host www.*.com (domain name) and is uniquely identified through "front-publish/home-h5-master/css/h5_4545200.css".

The web crawler includes the following four types.
(1) General purpose crawler: it is also known as whole web crawler, where a crawling object starts from a URI collection as a seed and gradually expands to the entire network space, and a service object of the general purpose crawler is mainly a search engine or a large Web data provider.
(2) Focused web crawler: it is also known as topic crawler, a web crawler that selectively crawls content highly related to predefined topics, such as a web crawler for crawling news, a web crawler for crawling forums, and a web crawler for crawling products, and the focused web crawler often accesses some highly time-sensitive data periodically, which is widely used with a specific crawling target, and meets needs of specific populations for specific field information.
(3) Incremental crawler: it is a web crawler that updates a downloaded web page incrementally and only crawls updated content, focusing on improving freshness of the crawled content.
(4) Deep web crawler: it is also known as hidden web (Hidden Web) crawler, where it is responsible for acquiring web content that cannot be indexed by a search engine, that is inaccessible to a hyperlink, or that is visible upon submission of a form (e.g., login or configuration is required).

The focused web crawler is often used for crawling data of a specified website, particularly data of a specified APP, capturing specific information in a web, such that a page of the website is imitated to develop the APP, or for illegally participating in activities of the website (such as mass use of red packs and coupons), etc., thereby bringing a safety risk to the website.

In the present embodiment, URIs are collected and classified in a specified manner to acquire a plurality of categories.

In general, the URIs belong to the same website or to the same APP, and the URIs also belong to different websites or different APPs, which is not limited in the present embodiment.

In one classification manner, the URIs are classified according to their functions.

Because the URIs with the same function have an identical or similar structure, a plurality of parts in the URI are traversed to determine the function of the uniform resource identifier and to organize the uniform resource identifiers implementing the same function into one category.

In the case that the URIs belong to the same APP, and the APP usually distinguishes the function of the resource by using a module and a method, a slash (i.e., "/") is used as a segmenting point to segment the uniform resource identifier into a plurality of fields. A field representing a domain name, a module, and a method is extracted from a corresponding position as a target field, and the target field representing a function of the uniform resource identifier is determined. In this case, in the case that the target field is present in the other URIs, it indicates that the URI belongs to a category corresponding to the target field.

In general, a domain name is located in a first field after a protocol, and a module is located in a second field after a protocol. In some cases, the field representing the module is empty.

For example, for a certain URI "https://www.*.com/24686574565", "www.*.com" represents a domain name, "24686574565" is a representing method of a number of a live streaming room, and the function of the URI is to enter the live streaming room, then a category is determined as "www.*.com/enter room".

For another example, for a certain URI of an APP for live streaming, "https://*.*cdn.cn/front-publish/live-master/css/home/home_9c316ba.css", "www.*.com" represents a domain name, "home" is a representing module of a live streaming room, "css" is a representing method of CSS, and the function of the URI is to enter the live streaming room, then a category is determined as "www.*.com/home/css".

The above method for classifying the URIs is only an example, and other methods for classifying the URIs are set based on actual situations when implementing the embodiments of the present disclosure. For example, for a URI of a forum website, in the case that an anchor representing a page flip (e.g., previous page, next page, <<, >>) is present, fields representing numbers are removed from the URI to which the anchor is linked, and in the case that the remaining fields are the same, it is determined that the remaining fields represent the category. For example, for "http://bbs.*.com/forum-99-2.html", "http://bbs.*.com/forum-99-3.html", in the case that number blocks "99-2" and "99-3" are removed, the remaining fields are the same, and the category is "bbs.*.com/forum", which is not limited in the embodiments of the present disclosure. In addition, besides the above method for classifying the URIs, those skilled in the art also use other methods for classifying the URIs based on the actual needs, which is not limited in the embodiments of the present disclosure either.

In step 102, a behavior of a client from each of IP addresses in a plurality of IP addresses accessing uniform resource identifiers under a category is monitored to acquire sample behavior data.

In an operation process of the website, in the case that the client accesses the URI, a log file is used to record information related to the behavior of the client accessing the URI. The information includes an operating system where the client is located, a terminal device where the client is located, an IP address of the client, a start time of the access, an end time of the access, a clicked element, and the like.

In the present embodiment, an IP address is used to identify a client, a category of a URI is used as a dimension of counting, and information of a behavior of the client under the IP address accessing the URI under the category is extracted from a historical log file as sample behavior data.

In step 103, the sample behavior data is encoded as a sample access vector.

The sample behavior data of each of the IP addresses is encoded into the vector in a specified manner and used as the sample access vector, such that a subsequent training for the isolation forest is facilitated.

In one encoding manner, the quantity of the uniform resource identifiers under each of categories accessed by the client from the IP address is counted from the sample behavior data, the category is taken as a dimension of the vector, and a plurality of quantities corresponding to the plurality of categories are set as values of a plurality of dimensions corresponding to the plurality of categories in the vector to acquire the sample access vector of each of the IP addresses.

For example, assuming that the URIs are classified into 400 categories, the categories of the URIs are sequenced and assigned numbers of 0 to 399, and in the case that the number of the URIs of a category with an IP address access number of 0 is 100, and the numbers of the URIs of the categories with access numbers of 1 to 399 are all 0, then a sample access vector for the IP address is [100, 0, 0, 0, . . . , 0].

In the present embodiment, the quantity of clients logged in by the user and the quantity of web crawlers accessing the URI are obviously different, and the quantity of the uniform resource identifiers under the plurality of categories accessed by the client of each of the IP addresses is counted as values of a plurality of dimensions in the sample access vector, such that the operation is simple and convenient, and the clients logged in by the user and the web crawlers are well distinguished, thereby improving performance of the isolation forest.

The above encoding manner is only an example, and when implementing the embodiments of the present disclosure, other encoding manners are set based on the actual situations. For example, the sample access vector of the IP address is acquired by counting the time for the client originating from the IP address to access the uniform resource identifiers under each of the categories from the sample behavior data, using the category as the dimension of the vector, and setting multiple times corresponding to the plurality of categories as the values of the plurality of dimensions corresponding to the plurality of categories in the vector, and the like, which is not limited in the embodiments of the present disclosure. In addition, besides the above encoding manner, those skilled in the art also adopt other encoding manners based on the actual needs, which is not limited in the embodiments of the present disclosure either.

Because some URIs are generated based on a timestamp, a picture name, a file name, and the like, in the case that the original website has many functions, the quantity of the URIs of a website is in millions, and after the URIs are classified, the categories still are on the order of hundreds or thousands. In the embodiments of the present disclosure, while a main feature component of the sample access vector is maintained, algorithms, such as principal component analysis (PCA), linear discriminant analysis (LDA), and locally linear embedding (LLE), are used to reduce the dimension of the sample access vector, reducing the dimension of the sample access vector to an order of one or ten, and reducing computational complexity. That is, resources occupied by training the isolation forests are reduced while the performance of the isolation forest is maintained.

Certainly, in the case that the functions of the website are relatively few, after the URIs are classified, the categories are on the order of one or ten, or the performance of the computer device is sufficient to support training of the isolation forest by using the sample access vector at a high latitude. At this time, the isolation forest is trained by directly using the sample access vector without reducing the dimension, which is not limited in the present embodiment.

Taking PCA as an example, the PCA is a method for reducing the dimension linearly, whose goal is to map high dimensional data into low dimensional space for representation through a certain linear projection, and to expect a maximum variance of data over the projected dimension, thereby using fewer data dimensions while preserving properties of more original data points.

Assuming m n-dimensional sample access vectors are present, the sample access vectors are combined into a matrix as a first sample access matrix X in n rows and m columns.

Zero averaging (subtracting a mean of the row) is performed on each row of data in the first sample access matrix X.

In the case that zero averaging is completed, a sample covariance matrix C, $C=1/mXX^T$ is calculated for the first sample access matrix X, where $X^T$ is a transposed matrix of X.

Sample eigenvalues and sample eigenvectors of the sample covariance matrix C are calculated.

The sample eigenvectors are arranged in rows from top to bottom according to a magnitude of the sample eigenvalues, and first k row(s) (k is an integer) are taken to form a second sample access matrix P.

A product between the second sample access matrix P and the first sample access matrix X is calculated to acquire a sample access vector Y, Y=PX after the dimension is reduced (i.e., reducing to k-dimensional).

In step 104, based on the sample access vector, an isolation forest for recognizing a web crawler from the client is trained.

A user logs in a client, and accesses a large quantity of URIs when accessing a website. A live website is taken as an example, a large quantity of the URIs are loaded when a home page of the live website is opened, and forms of the URIs are as follows, such as data of a home page live video, a website css style, a live streaming room list, a hot list:

https://www.*.com/
    https://*.*cdn.cn/front-publish/home-h5-master/css/
        h5_4545200.css
    https://*.*cdn.cn/front-publish/live-master/css/home/
        home_9c316ba.css
    https://*.*cdn.cn/front-publish/live-master/css/home/pre-
        style-main-31ecd969_5f5e458.css
    https://*.*cdn.cn/static/img/
        ping43.gif?cache=0.41438868879293733
    https://global-oss-*.*/*/room-list/get-page-info
    . . .

Moreover, as the user accesses more URIs using functions of the website, different functions load different URIs, many of which are accessed without the user's perception.

Although different users have different access behaviors, such as functions used, the number of times used, and specific URIs used, the overall distribution of user behaviors at levels of millions and tens of millions, even though a user has randomness, an overall proportion of a plurality of URIs is roughly in a normal distribution.

In the case that the client is a web crawler, the web crawler is more purposeful. For example, a crawler for crawling anchor information crawls an anchor number list in a first step, and after the list is acquired, URI download information representing a live streaming room is crawled in batch. Assuming the URI of a live page of the anchor is https://www.*.com/23214324325 (the number is an ID of the live streaming room), then a URI sequence of web crawler activities is as follows:

https://www.*.com/room-list/get-page-info
    https://www.*.com/23214324325
    https://www.*.com/23432543654
    https://www.*.com/24354365462
    https://www.*.com/24654654534
    https://www.*.com/24686574565
    . . .

A behavior (such as the quantity of accesses) of a user accessing different URIs and a behavior (such as the quantity of accesses) of a web crawler accessing different URIs have greater difference. Because the web crawler is purposeful and is an artificially set machine behavior, randomness of the user is difficult to simulate. Therefore, in the embodiment, in view of a fact that an access behavior of the web crawler in the whole is sparse, and an isolation forest (iForest) is sensitive to points of a global coefficient, the web crawler is effectively identified based on the difference of different access behaviors, and the isolation forest for identifying the web crawler from the client is trained.

The isolation forest is a rapid anomaly detection method based on the ensemble, and has linear time complexity and high accuracy. The isolation forest is an algorithm which meets requirements of large data processing, is applicable to anomaly detection of continuous numerical data. Unlike other anomaly detection algorithms that portray the sparsity between samples by quantitative indicators such as distance and density, the isolation forest detects an abnormal value by isolating a sample point, that is, anomalies are defined as outliers that are easily isolated, which is interpreted as points that are sparsely distributed and far from high density populations. Explained statistically, inside the data space, a sparsely distributed region indicates a low probability of data occurring in the region, thus it is considered that data falling within the regions are abnormal.

In addition, compared with traditional algorithms, such as local outlier factor (LOF) and a K-means cluster, an isolation forest algorithm has better robustness on high latitude data.

Figure 2A:
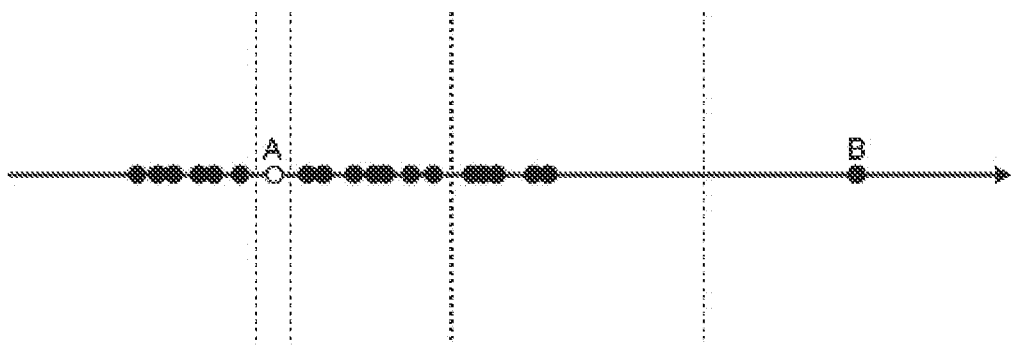
FIG. 2A is an exemplary diagram of a principle of an isolation forest according to some embodiments of the present disclosure.

As shown in FIG. 2A, FIG. 2A is an exemplary diagram of a principle of an isolation forest according to some embodiments of the present disclosure. Assuming that a group of one-dimensional data is present, and the group of data is randomly segmented, such that a point A and a point B are separately segmented out. For example, a metric of segmentation is set, a value x is randomly selected between a maximum value and a minimum value, and data are segmented into a left group of data and a right group of data based on a criterion of being less than x and being greater than or equal to x. The step is repeated separately in the two groups of data until the data cannot be segmented. Obviously, the point B is separated from other data, and the point B is segmented out with a small number of times. The point A is grouped with other data points, and the point A is segmented out with a great number of times.

Figure 2B:
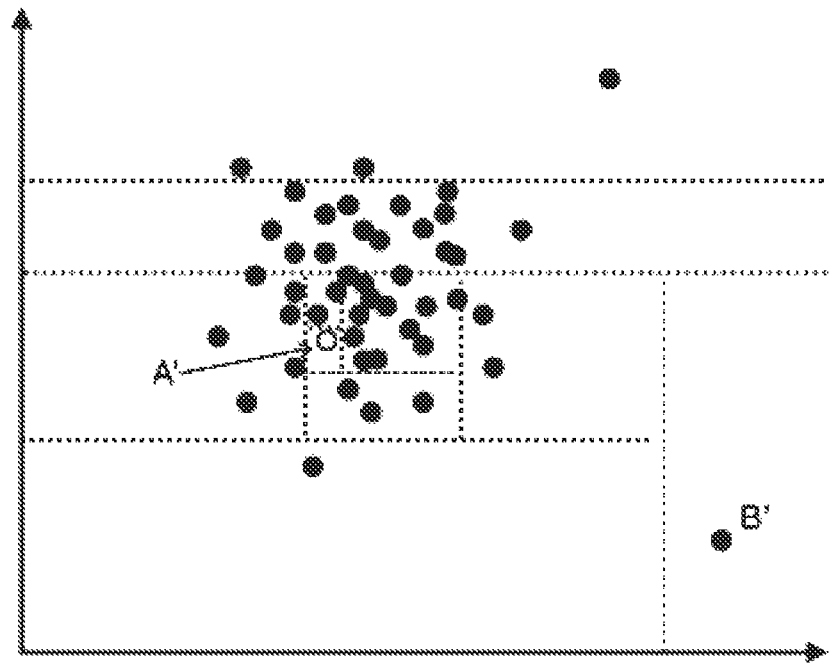
FIG. 2B is an exemplary diagram of another principle of an isolation forest according to some embodiments of the present disclosure.

As shown in FIG. 2B, FIG. 2B is an exemplary diagram of another principle of an isolation forest according to some embodiments of the present disclosure, and expands the data from one-dimensional to two-dimensional. Similarly, a metric of segmentation is set, random segmentation is carried out along two coordinate axes, and the point A' and the point B' are independently segmented out. A feature dimension is randomly selected, a value between a maximum value and a minimum value of the feature is randomly selected, and the data are segmented into a left group of data and a right group of data based on a size relation with an eigenvalue. The above step is repeated in the left group of data and the right group of data, and the data are randomly segmented according to a value of a certain feature dimension until the data cannot be segmented, that is, only one data point is left, or the left data is the same. Intuitively, the point B' is separated from other data points, and the point B' is likely segmented out with few operations; the point A' is grouped with other data points, and the point A is segmented out with a great number of times.

Generally, as shown in FIG. 2A and FIG. 2B, the point B and the point B' are considered as abnormal data due to being spaced apart from other data, and the point A and the point A' are considered as normal data. Intuitively, because the abnormal data is relatively separated from other data points, the abnormal data are segmented out independently from other data points with a few times of splitting, while the normal data are just in the opposite case, and it is a concept of iForest.

In some embodiments of the present disclosure, step 104 includes the following steps.

In step 1041, a metric for distinguishing the web crawler is determined.

Different metrics are counted for the sample access vector, and in the present embodiment, the metric capable of distinguishing the web crawler is extracted from the metrics.

In some embodiments, with the quantity of accesses (i.e., a value of a dimension) as an indicator to distinguish the web crawler, the URIs accessed by the web crawler and the URIs accessed by most users are relatively consistent for certain pages. However, the quantity of the URIs accessed by the web crawler and the quantity of the URIs accessed by users vary greatly. For example, the quantity of live pages of the anchor accessed by a user generally ranges from 1 to 50 times while the quantity of live pages of the anchor accessed by the web crawler is in the hundreds or even thousands of times.

In the example, the quantity of accesses to uniform resource identifiers is determined as a metric for distinguishing the web crawler.

In another example, with a dimension of an access as a metric to distinguish the web crawler, the URIs accessed by the web crawler and the URIs accessed by most users vary greatly for certain pages. For example, the user has primary access to URIs under types numbered 0-50, while the web crawler has primary access to URIs under types numbered 51-399.

In the example, the quantity of all the uniform resource identifiers accessed under categories is determined as a metric for distinguishing the web crawler.

The above metric is only an example, and when the embodiments of the present disclosure are implemented, other metrics are set according to the actual situations. For example, duration of accessing the uniform resource identifiers is determined and used as a metric for distinguishing the web crawler, or duration of all the uniform resource identifiers accessed under the categories is determined and used as a metric for distinguishing the web crawler, and the like, which is not limited in the embodiments of the present disclosure. In addition, besides the above method for determining the metric, those skilled in the art also adopt other metrics based on the actual needs, which is not limited in the embodiments of the present disclosure.

In step 1042, under the metric, a portion of the sample access vectors are used for multiple times to generate a plurality of isolation trees to acquire the isolation forest.

The isolation forest includes t (t is a positive integer) isolation trees, each of the isolation trees is a binary tree structure, the isolation forest segments data using the binary tree, and the depth of a data point in the binary tree reflects a "separating" degree of the data.

The training condition is preset, for example, the IP address in the current node is prohibited from being segmented (i.e., the IP address in the current node is one, or all the IP addresses in the current node are the same), the isolation tree reaches the preset height, and the like.

In the case that an isolation tree is constructed, a portion of the sample access vectors are randomly extracted from a total amount of sample access vectors, the sample access vectors are used as root nodes of the isolation tree and traversed from a root node, that is, the root node is an initial current node.

Whether the preset training condition is met currently is determined.

In the case that it is yes (i.e., the training condition is met), it is determined that the isolation tree is trained.

In the case that it is not (i.e., the training condition is not met), a cutting point is generated in a cutting range of the current node in a random manner under the metric. The cutting range is a range formed by values of the sample access vectors under the metric, that is, a minimum value and a maximum value of the sample access vector under the metric are used as two endpoint values of the cutting range, such that a value of the cutting point is between a maximum value and a minimum value of the metric.

A hyperplane is generated at the cutting point, and a space of the current node is divided into two subspaces, that is, the current node is used as a father node to generate a first child node and a second child node. Generally, the first child node is located at a left side, and the second child node is located at a right side.

A value of the sample access vector in the current node under the metric is compared with the cutting point.

In the case that the value of the sample access vector under the metric is smaller than the cutting point, add the IP address to the first child node.

In the case that the value of the sample access vector under the metric is greater than or equal to the cutting point, add the IP address to the second child node, and return to determine whether the preset training condition is met or not currently. In the case that the training condition is not met, take the first child node and the second child node as current nodes to continuously construct new nodes until the isolation tree is trained.

The training is repeated for t times to generate t isolation trees in total to train the isolation forest, and the isolation forest is tested after the isolation forest is trained. In the case that evaluation metrics (such as accuracy, precision, recall and F1 value) of the test meet the requirements, the isolation forest is launched to monitor the IP address and detect whether a client under a plurality of IP addresses is a web crawler.

Figure 3:
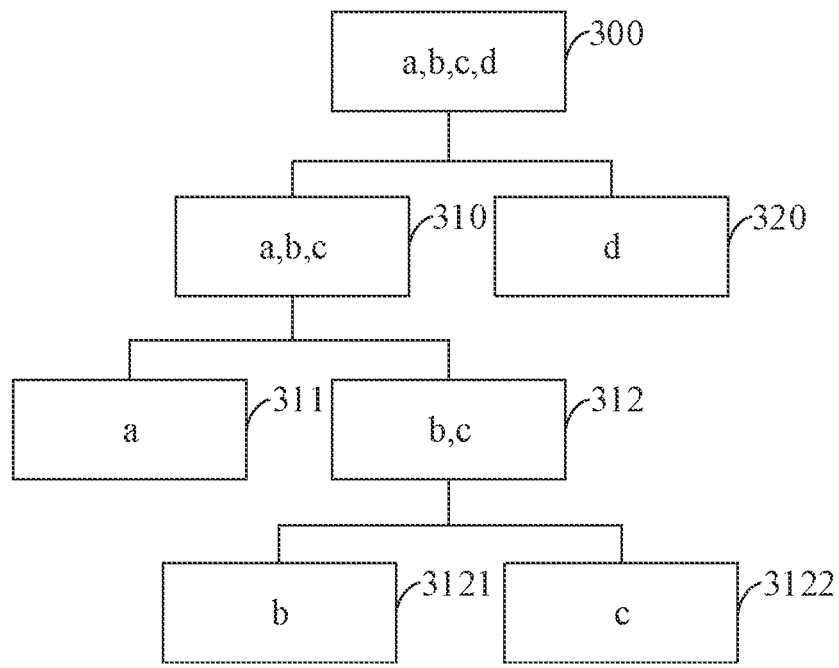
FIG. 3 is an exemplary diagram of generating an isolation tree according to some embodiments of the present disclosure.

For example, as shown in FIG. 3, an isolation tree is trained by randomly extracting a batch of sample access vectors of IP addresses a, b, c, d are from a total set of IP addresses, a, b, c, d are added to a node 300 as root nodes, and a metric for distinguishing a web crawler is specified. For the node 300, under the metric, a cutting point $T_1$ is randomly generated among values in the sample access vectors of a, b, c, d, values of a, b, c are all smaller than $T_1$, and a value of d is greater than $T_1$, then a, b, c are added to a node 310 (i.e., a first child node), and d is added to a node 320 (i.e., a second child node). For the node 320, as the node 320 only has one IP address d, construction of a new node is stopped. For the node 310, under the metric, a cutting point $T_2$ is randomly generated among values in the sample access vectors of a, b, c, a value of a is smaller than $T_2$, and values of b, c are greater than $T_2$, then a is added to a node 311 (i.e., the first child node), and b, c are added to a node 312 (i.e., the second child node). For the node 311, because the node 311 only has one IP address a, the construction of a new node is stopped. For a node 312, under the metric, a cutting point $T_3$ is randomly generated between values in the sample access vectors of b, c, a value of b is less than $T_3$, and a value of c is greater than $T_3$, then b is added to a node 3121 (i.e., the first child node), and c is added to a node 3122 (i.e., the second child node). For the node 3121, because the node 3121 only has one IP address b, the construction of a new node is stopped. For the node 3122, because the node 3122 only has one IP address c, the construction of a new node is stopped. At this point, the isolation tree is trained, where the height of b and c is 3, the height of a is 2, and the height of d is 1, because d is initially isolated, it is most likely that d is abnormal.

In the present embodiment, uniform resource identifiers are classified to acquire a plurality of categories, a behavior of a client from each of IP addresses accessing uniform resource identifiers under a category is monitored to acquire sample behavior data. The sample behavior data are encoded as a sample access vector, and based on the sample access vector, an isolation forest for recognizing a web crawler from the client is trained. On one aspect, because the uniform resource identifiers with identical or similar functions have an identical or similar structure, classifying and counting access behaviors of uniform resource identifiers not only maintain effectiveness of the access behaviors, but also greatly reduce data volume of the access behaviors and reduce resources occupied by training the isolation forests. On the other aspect, because the web crawler is purposeful, the access behavior of the web crawler is obviously different from that of the user, such that the access behavior of the web crawler is sparse in the whole access behavior, an isolation feature is sensitive to the feature, performance of the isolation forest is guaranteed, the web crawler is effectively recognized, the access behavior of the user is not an artificially formulated rule, the isolation feature belongs to an unsupervised monitoring mode, the web crawler cannot simulate the access behavior of the user, and the supervised monitoring cannot be bypassed by forging a normal UA, dynamically replacing an IP address, using a distributed architecture, and the like, thereby effectively ensuring safety of a website.

Figure 4:
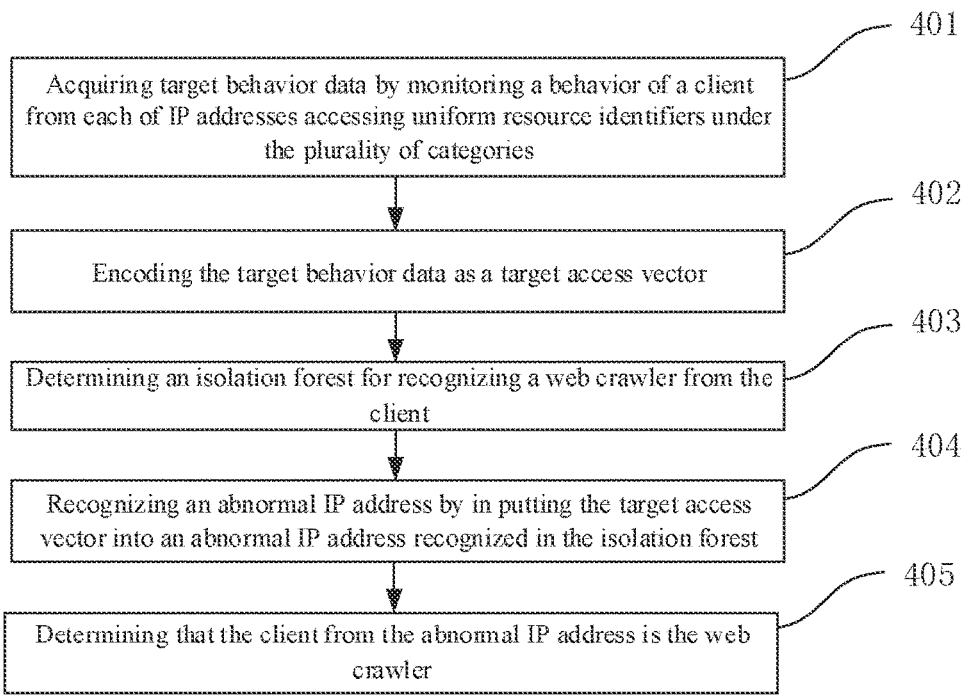
FIG. 4 is a flowchart of a method for recognizing a web crawler according to some embodiments of the present disclosure.

FIG. 4 is a flowchart of a method for recognizing a web crawler according to some embodiments of the present disclosure. The present embodiment is applicable to a situation where a web crawler is recognized based on a behavior of a web crawler isolated from a behavior of a user, and the method is executed by an apparatus for recognizing the web crawler. The apparatus is achieved by software and/or hardware, and is configured in a computer device, such as a server, a personal computer, a workstation, including the following steps.

In step 401, a behavior of a client from each of IP addresses accessing uniform resource identifiers under a plurality of categories is monitored to acquire target behavior data.

In an operation process of the website, in the case that the client accesses the URI, a log file is used to record information related to the behavior of the client accessing the URI.

In the present embodiment, the plurality of categories are set for the URI in advance.

In some embodiments, in the case that a category of a URI is characterized by a target field (e.g., a field representing a domain name, a module, and a method) representing a function, such as "www.*.com/home/css", each of the fields in the URI is traversed. In the case that the target field in the URI is present, it is determined that the URI belongs to the category.

Furthermore, an IP address is used to identify a client, a category of a URI is used as a dimension of counting, and information of a behavior of the client under the IP address accessing the URI under the category is extracted from a real time log file as target behavior data.

In step 402, the target behavior data is encoded as a target access vector.

The target behavior data of each of the IP addresses is encoded into the vector by a specified method and used as the target access vector, such that a subsequent processing for the isolation forest is facilitated.

For monitoring the IP address of a website in real time, in order to improve monitoring flexibility and ensure safety of the website, recognition of a web crawler is triggered by the following two methods.

In one triggering method, in the case that the time for accumulating the target behavior data exceeds a preset first threshold, the target behavior data is encoded as the target access vector, that is, the recognition of the web crawler is performed on each of the IP addresses at intervals.

In another triggering method, in the case that the quantity of the uniform resource identifiers accessed by the client from the IP address in the target behavior data exceeds a preset second threshold, the target behavior data are encoded as the target access vector, that is, the recognition of the web crawler is performed on the IP address when a certain quantity of accesses are accumulated.

In one encoding method, the quantity of the uniform resource identifiers accessed by the client from the IP address under each of the categories in the target behavior data is counted, the category is taken as a dimension of the vector, and the plurality of quantities are set as values of a quantity of dimensions in the vector to acquire the target access vector of the IP address.

In addition, in the case that a main feature component of the target access vector is maintained, the dimension of the target access vector is reduced through algorithms, such as PCA, LDA, and LLE, the dimension of the target access vector is reduced to the order of one or ten, thereby reducing the computational complexity and the resources occupied by running the isolation forest.

Taking PCA as an example, assuming m n-dimensional target access vectors are present, the target access vectors are combined into a matrix as a first target access matrix X in n rows and m columns.

Zero averaging (subtracting a mean of the row) is performed on each row of data in the first target access matrix X.

In the case that zero averaging is completed, a sample covariance matrix C, $C=1/mXX^T$ is calculated for the first target access matrix X, where $X^T$ is a transposed matrix of X.

Target eigenvalues and target eigenvectors of the target covariance matrix C are calculated.

The target eigenvectors are arranged in rows from top to bottom according to a magnitude of the target eigenvalues, and first k row(s) (k is an integer) are taken to form a second target access matrix P.

A product between the second target access matrix P and the first target access matrix X is calculated to acquire a target access vector Y, Y=PX after the dimension is reduced (i.e., reducing to k-dimensional).

In step 403, an isolation forest configured to recognize a web crawler from the client is determined.

A method of the above embodiments is applied to train the isolation forest for recognizing the web crawler from the client in advance, which is loaded and started while monitoring the IP address in real time.

In step 404, the target access vector is inputted into an abnormal IP address recognized in the isolation forest.

In the present embodiment, the target access vector is inputted into the isolation forest. The isolation forest searches for an isolated target access vector, thereby recognizing whether the IP address is normal or abnormal.

Because the quantity of the abnormal IP addresses is small (i.e., the abnormal IP address has a small percentage of all the IP addresses), and the abnormal IP address has a separation from most normal IP addresses, the abnormal IP address is isolated earlier.

Figure 5:
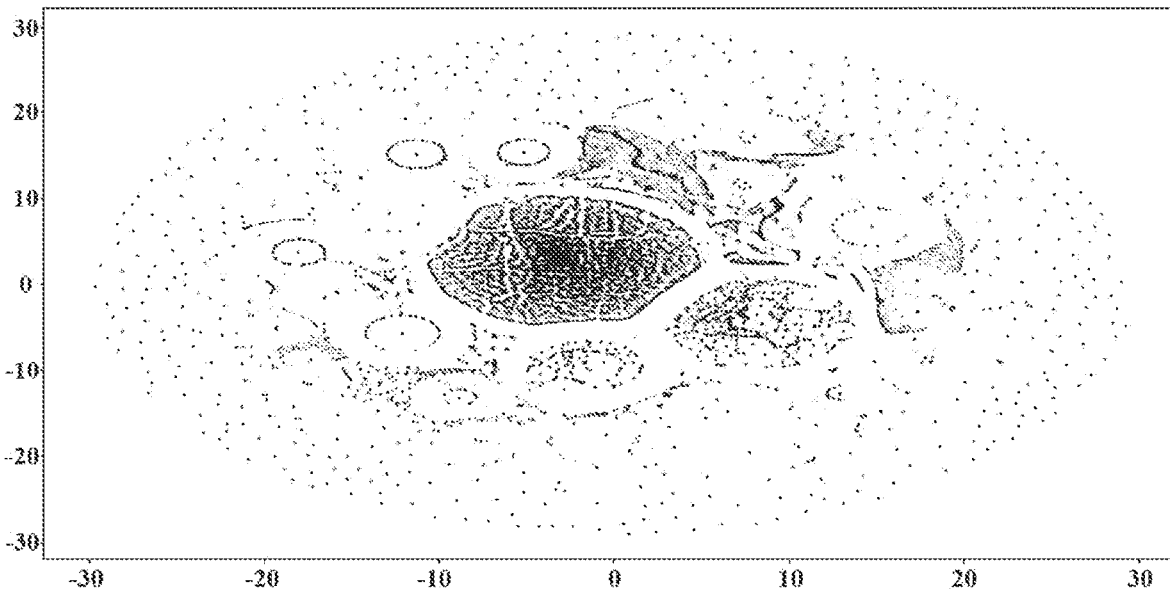
FIG. 5 is a schematic diagram of distribution of IP addresses after reducing a dimension according to some embodiments of the present disclosure.

As shown in FIG. 5, for visualization, the target behavior vector is reduced to a two-dimensional vector, the normal IP addresses are concentrated, and a large quantity of scattered points are abnormal IP addresses.

In some embodiments of the present disclosure, step 404 includes the following steps.

In step 4041, each of isolation trees in the isolation forest is traversed based on the target access vector to calculate an abnormal value of the IP address.

The isolation forest includes t isolation trees, a target access vector of each of the IP addresses traverses each of the isolation trees, an abnormal IP address is closer to a root node of the isolation tree, while a normal IP address is farther from the root node, such that an abnormal condition of the IP address in the entire isolation forest is comprehensively measured with reference to an abnormal condition of the IP address in each of the isolation trees, and the abnormal condition is numerically changed into an abnormal value.

The IP address is added to the root node of the isolation tree in each of the isolation trees, and it is started to be processed from the root node, that is, the root node is an initial current node.

A metric for distinguishing the web crawler is determined. For example, the quantity of the uniform resource identifiers accessed is determined as the metric for distinguishing the web crawler, and/or the quantity of all the uniform resource identifiers accessed under the category is determined as the metric for distinguishing the web crawler.

A cutting point of the current node is queried, and a value of the target access vector in the current node under the metric is compared with the cutting point.

In the case that the value of the target access vector under the metric is smaller than the cutting point, add the IP address to the first child node under the current node.

In the case that the value of the target access vector under the metric is greater than or equal to the cutting point, the IP address is added to the second child node under the current node, and the cutting point is returned to perform a query on the current node. In the case that segmentation is not met, the first child node and the second child node are used as the current nodes to continuously segment the plurality of IP addresses until the IP address in the current node is prohibited to be segmented (that is, the IP address in the current node is one, or all the IP addresses in the current node are the same).

Figure 6:
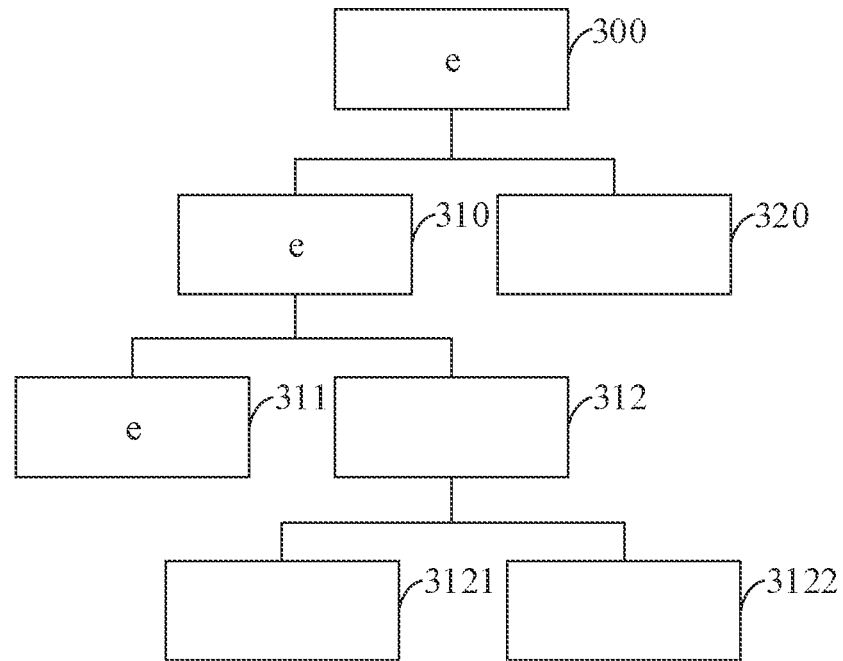
FIG. 6 is an exemplary diagram of traversing an isolation tree according to some embodiments of the present disclosure.

For example, as shown in FIG. 6, an isolation tree has node 300, node 310, node 320, node 311, node 312, node 3121, and node 3122, a cutting point $T_1$ is set for the node 300, a cutting point $T_2$ is set for the node 310, a cutting point $T_3$ is set for the node 312, and a metric for distinguishing the web crawler is specified. In the case that a target access vector is acquired by currently monitoring an IP address e, and under the metric, a value in the target access vector of e is smaller than $T_1$, e is added to the node 310, and under the metric, a value in the target access vector of e is smaller than $T_2$, e is added to the node 311. In this case, the height of e in the isolation tree is 2.

In the case that the target access vector traverses each of the isolation trees, an abnormal value of the IP address is calculated based on the height (also called path length and depth) of the IP address in all the isolation trees.

Assuming that an IP address of a leaf node where an IP address X falls in the isolation tree is T.size, the path length h(X) of the IP address X on the isolation tree is:

$$h(x) = e + C(T.size)$$

wherein e represents the quantity of edges that the IP address x passes through from the root node to the leaf node of the isolation tree, and C(T.size) is considered as a correction value that represents the average path length in a binary tree constructed with T.size IP addresses.

In general, C(n) represents as follows:

$$C(n) = 2H(n-1) - \frac{2(n-1)}{n}$$

wherein H(n−1) is estimated with ln(n−1)+0.5772156649, and 0.5772156649 is a Euler constant.

The IP address x is a result that a final abnormal value Score(x) combines results of a plurality of isolation trees:

$$\text{Score}(x) = 2^{\frac{E(h(x))}{C(\varphi)}}$$

wherein E(h(x)) represents a mean of the path length of the IP address x in the plurality of isolation trees, φ represents the quantity of IP addresses of a single isolation tree, and C(φ) represents the average path length of an isolation tree constructed by φ IP addresses, which is used for normalization.

For an abnormal value Score(x), in the case that the shorter the average path length of the IP address x in the plurality of isolation trees, the closer the abnormal value Score(x) is to 1, indicating that the IP address x is more abnormal. In the case that the longer the average path length of the IP address x in the plurality of isolation trees, the closer the abnormal value Score(x) is to 0, indicating that the IP address x is more normal. In the case that the average path length of the IP address x in the plurality of isolation trees is close to an overall mean, the abnormal value Score(x) is around 0.5.

In step 4042, in the case that the abnormal value is greater than a preset threshold, it is determined that the IP address is abnormal.

Generally, the larger the abnormal value is, the higher the degree of abnormality of the IP address is, whereas the smaller the abnormal value is, the lower the degree of abnormality of the IP address is.

The abnormal value of each of the IP addresses is compared with the preset threshold.

In the case that the abnormal value of a certain IP address is larger than the threshold, the degree of abnormality of the IP address is high, and it is determined as abnormal.

In the case that the abnormal value of a certain IP address is less than or equal to the threshold, the degree of abnormality of the IP address is low, and it is determined as normal.

In step 405, it is determined that the client from the abnormal IP address is the web crawler.

For an abnormal IP address, the client under the abnormal IP address is identified as the web crawler, and an abnormal processing is performed on the client under the IP address. For example, the access from the abnormal IP address is blocked, the client under the IP address is pulled into a blacklist, and the like.

In the present embodiment, because the encoding of the target access vector, the dimension reduction of the target access vector, the determination of the metric for distinguishing the web crawler, and the like are basically similar to applications of the encoding of the sample access vector, the dimension reduction of the sample access vector, the determination of the metric for distinguishing the web crawler, and the like in the above embodiments, the description is relatively simple, and relevant points are referred to the partial description of the above embodiments, and the present embodiment is not described in detail herein.

In the present embodiment, a behavior of a client from each of IP addresses accessing uniform resource identifiers under the plurality of categories to acquire target behavior data, the target behavior data is encoded as the target access vector, the isolation forest configured to recognize a web crawler from the client is determined, the target access vector is inputted into an abnormal IP address recognized in the isolation forest, and it is determined that the client from the abnormal IP address is the web crawler. On aspect, because the uniform resource identifiers with the same or similar functions have the same or similar structure, classifying and counting access behaviors of uniform resource identifiers not only maintain effectiveness of the access behavior, but also greatly reduce data volume of the access behavior and reduce resources occupied by training the isolation forests. On the other aspect, because the web crawler is purposeful, the access behavior of the web crawler is obviously different from that of the user, such that the access behavior of the web crawler is sparse in the whole access behavior, an isolation feature is sensitive to the feature, such that the isolation forest effectively recognizes the web crawler, and the access behavior of the user is not an artificially formulated rule, the isolation feature belongs to an unsupervised monitoring mode, the web crawler cannot simulate the access behavior of the user, and the supervised monitoring cannot be bypassed by forging a normal UA, dynamically replacing an IP address, using a distributed architecture and the like, thereby effectively ensuring the safety of a website.

It should be noted that, for simplicity of description, the method embodiments are described as a series of actions, but those skilled in the art should understand that the embodiments of the present disclosure are not limited by the described sequence of actions, because some steps are executed in other sequences or simultaneously according to the embodiments of the present disclosure. Furthermore, those skilled in the art should also appreciate that the embodiments described in the specification are exemplary embodiments and actions involved is not necessary for the embodiments of the present disclosure.

Figure 7:
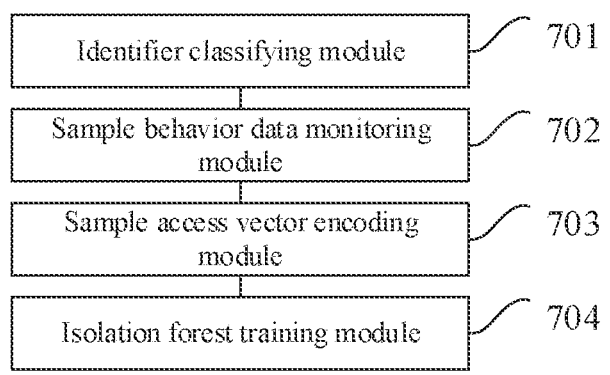
FIG. 7 is a schematic structural diagram of an apparatus for training isolation forests according to some embodiments of the present disclosure.

FIG. 7 is a structural block diagram of an apparatus for training isolation forests according to some embodiments of the present disclosure, including the following modules:

an identifier classifying module 701, configured to acquire a plurality of categories by classifying uniform resource identifiers;

a sample behavior data monitoring module 702, configured to acquire sample behavior data by monitoring a behavior of a client from each of IP addresses accessing uniform resource identifiers under the category;

a sample access vector encoding module 703, configured to encode the sample behavior data as a sample access vector; and an isolation forest training module 704, configured to train, based on the sample access vector, an isolation forest for recognizing a web crawler from the client.

In some embodiments of the present disclosure, the identifier classifying module 701 includes:

a function determining submodule, configured to determine a function of the uniform resource identifier;

a function classifying submodule, configured to organize the uniform resource identifiers implementing a same function into one category.

In some embodiments of the present disclosure, the function determining submodule includes:

a segmenting unit, configured to segment the uniform resource identifier into a plurality of fields with a slash as a segmentation point;

a target field extracting unit, configured to extract a field representing a domain name, a module, and a method as a target field; and a target field charactering unit, configured to determine that the target field represents a function of the uniform resource identifier.

In some embodiments of the present disclosure, the sample access vector encoding module 703 includes:

a sample behavior data counting submodule, configured to count a quantity of uniform resource identifiers under each of the categories accessed by the client from each the IP address in the sample behavior data; and a sample dimension determining submodule, configured to determine the category as a dimension of the vector, and set the plurality of quantities as values of the plurality of dimensions in the vector to acquire the sample access vector of the IP address.

In some embodiments of the present disclosure, the isolation forest training module 704 includes:

a metric determining submodule, configured to determine a metric for distinguishing the web crawler; and an isolation tree generating submodule, configured to, under the metric, acquire the isolation forest by generating a plurality of isolation trees using a portion of the sample access vectors multiple time.

In some embodiments of the present disclosure, the metric determining submodule includes:

an access amount determining unit, configured to determine a quantity of the uniform resource identifiers as the metric for distinguishing the web crawler; and/or, an access dimension determining unit, configured to determine a quantity of all the uniform resource identifiers accessed under the category to as the metric for distinguishing the web crawler.

In some embodiments of the present disclosure, the isolation tree generating submodule includes:

a root node setting unit, configured to randomly extract a portion of the sample access vectors as root nodes of the isolation tree;

a training condition determining unit, configured to determine whether the preset training condition is met currently, call a training completion determining unit in response to the preset training condition being met, and call a cutting point generating unit in response to the preset training condition being not met;

a training completion determining unit, configured to determine that the isolation tree is trained;

a cutting point generating unit, configured to generate a cutting point within a cutting range of a current node, wherein the current node is initially the root node, and the cutting range is a range formed by values of the sample access vectors under the metric;

a child node generating unit, configured to generate a first child node and a second child node by taking the current node as a father node; and a sample adding unit, configured to add the IP address to the first child node in response to the value of the sample access vector under the metric being smaller than the cutting point, and add the IP address to the second child node in response to the value of the sample access vector under the metric being greater than or equal to the cutting point, and return to call the training condition determining unit.

In some embodiments of the present disclosure, further including:

a sample access vector dimension reducing module, configured to reduce a dimension of the sample access vector.

In some embodiments of the present disclosure, the sample access vector dimension reducing module includes:
- a first sample access matrix combining submodule, configured to combine the sample access vectors into a matrix as a first sample access matrix;
- a sample zero averaging submodule, configured to perform zero averaging on each row of data in the first sample access matrix;
- a sample covariance matrix computing submodule, configured to compute a sample covariance matrix for the first sample access matrix in the response to determining that zero averaging is complete;
- a sample feature computing submodule, configured to calculate sample eigenvalues and sample eigenvectors of the sample covariance matrix;
- a second sample access matrix generating submodule, configured to arrange the sample eigenvectors in rows from top to bottom according to a magnitude of the sample eigenvalues, and taking first k row(s) to form a second sample access matrix; and
- a sample vector dimension reducing submodule, configured to acquire a sample access vector upon reducing the dimension by calculating a product between the second sample access matrix and the first sample access matrix.

The apparatus for training the isolation tree according to the embodiments of the present disclosure executes the method for training the isolation forests according to any one of embodiments of the present disclosure, and has corresponding function modules and beneficial effects to executing the method.

Figure 8:
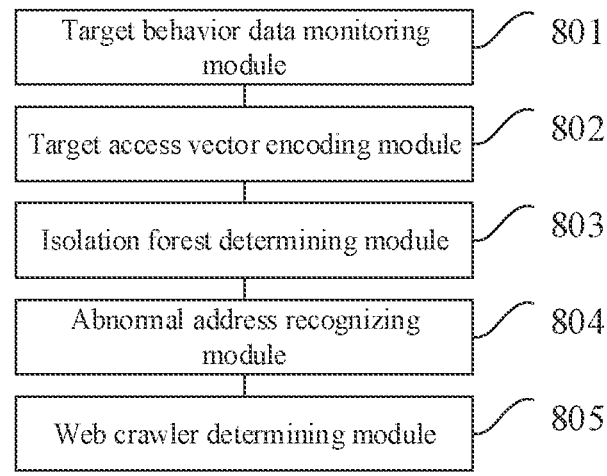
FIG. 8 is a schematic structural diagram of an apparatus for recognizing a web crawler according to some embodiments of the present disclosure.

FIG. 8 is a structural block diagram of an apparatus for recognizing a web crawler according to some embodiments of the present disclosure, including the following modules:
- a target behavior data monitoring module 801, configured to acquire target behavior data by monitoring a behavior of a client from each of IP addresses accessing uniform resource identifiers under a plurality of categories;
- a target access vector encoding module 802, configured to encode the target behavior data as a sample access vector; and
- an isolation forest determining module 803, configured to determine an isolation forest for recognizing a web crawler from the client;
- an abnormal address recognizing module 804, configured to recognize an abnormal IP address by inputting the target access vector into the isolation forest; and
- a web crawler determining module 805, configured to determine that the client from the abnormal IP address is the web crawler.

In some embodiments of the present disclosure, the abnormal address recognizing module 804 includes:
- an abnormal value computing submodule, configured to calculate an abnormal value of each of the IP addresses by traversing each of the isolation trees in the isolation forest based on the target access vector; and
- an abnormal address determining submodule, configured to determine that the IP address is abnormal in response to the abnormal value being greater than a preset threshold.

In some embodiments of the present disclosure, the abnormal value computing submodule includes:
- a root node adding submodule, configured to add the IP address to a root node of the isolation tree in each of the isolation trees;
- a metric determining submodule, configured to determine a metric for distinguishing the web crawler; and
- a cutting point querying submodule, configured to query a cutting point of a current node, wherein the current node is initially the root node;
- a child node adding submodule, configured to add the IP address to a first child node under the current node in response to the value of the target access vector under the metric being smaller than the cutting point, and add the IP address to a second child node under the current node in response to the value of the target access vector under the metric being greater than or equal to the cutting point, and return to call the cutting point querying submodule; and
- an abnormal value computing submodule, configured to calculate an abnormal value of the IP address based on the height of the IP address in all the isolation trees in response to the target access vector completing traversing each of the isolation trees.

In some embodiments of the present disclosure, the metric determining submodule includes:
- an access amount determining unit, configured to determine the quantity of the uniform resource identifiers as the metric for distinguishing the web crawler;

and/or,
- an access dimension determining unit, configured to determine the quantity of all the uniform resource identifiers accessed under the category as the metric for distinguishing the web crawler.

In some embodiments of the present disclosure, the target access vector encoding module 802 includes:
- a first triggering submodule, configured to encode the target behavior data as the target access vector in response to a period of time for accumulating the target behavior data exceeding a preset first threshold;

or,
- a second triggering submodule, configured to encode the target behavior data as the target access vector in response to the quantity of the uniform resource identifiers accessed by the client from the IP address in the target behavior data exceeding a preset second threshold.

In some embodiments of the present disclosure, the target access vector encoding module 802 includes:
- a target behavior data counting submodule, configured to count the quantity of uniform resource identifiers under each of the categories accessed by the client from the IP address in the target behavior data; and
- a target dimension determining submodule, configured to determine the category as a dimension of the vector, and set the plurality of quantities as values of the plurality of dimensions in the vector to acquire the target access vector of the IP address.

In some embodiments of the present disclosure, further including:
- a target access vector dimension reducing module, configured to reduce a dimension of the target access vector.

In some embodiments of the present disclosure, the target access vector dimension reducing module includes:
- a first target access matrix combining submodule, configured to combine the target access vectors into a matrix as a first target access matrix;
- a target zero averaging submodule, configured to perform zero averaging on each row of data in the first target access matrix;

a target covariance matrix computing submodule, configured to calculate a target covariance matrix for the first target access matrix in response to zero averaging being complete;

a target feature computing submodule, configured to calculate target eigenvalues and sample eigenvectors of the target covariance matrix;

a second target access matrix generating submodule, configured to arrange the sample eigenvectors in rows from top to bottom according to a magnitude of the target eigenvalues, and taking first k row(s) to form a second target access matrix; and a target vector dimension reducing submodule, configured to acquire a sample access vector upon reducing the dimension by calculating a product between the second target access matrix and the first target access matrix.

The apparatus for recognizing the web crawler according to the embodiments of the present disclosure executes the method for recognizing the web crawler according to any embodiment of the present disclosure, and has corresponding function modules and beneficial effects to executing the method.

Figure 9:
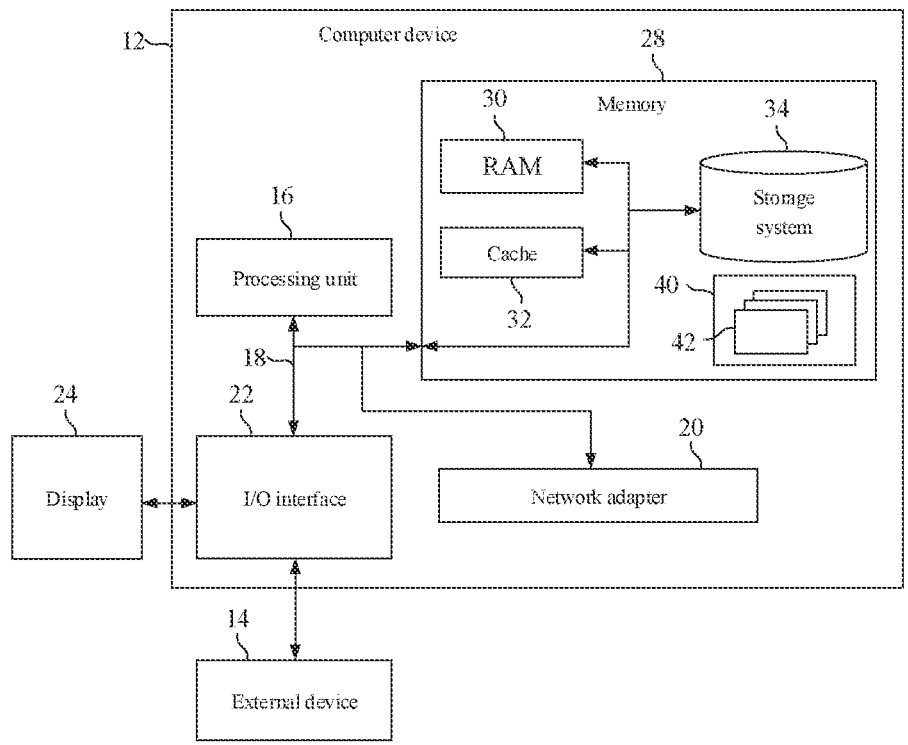
FIG. 9 is a schematic structural diagram of a computer device according to some embodiments of the present disclosure.

FIG. 9 is a schematic structural diagram of a computer device according to some embodiments of the present disclosure. FIG. 9 illustrates a block diagram of an exemplary computer device 12 suitable for implementation of the present disclosure. The computer device 12 shown in FIG. 9 is only an example, and should not bring any limitation to the function and the scope of use of the embodiments of the present disclosure.

As shown in FIG. 9, the computer device 12 is in a form of a general purpose computing device. Components of the computer device 12 includes, but are not limited to: one or more processors or processing units 16, a system memory 28, and a bus 18 connecting various system components including the system memory 28 and the processing unit 16.

The bus 18 represents one or more of several types of bus structures, including a memory bus or a memory controller, a peripheral bus, an accelerated graphics port, a processor, or a local area bus using any bus structure among a plurality of bus structures. For example, such structures include, but are not limited to, an industry standard architecture (ISA) bus, a micro-channel architecture (MAC) bus, an enhanced ISA bus, a video electronics standards association (VESA) local bus, and a peripheral component interconnect (PCI) bus.

The computer device 12 includes a variety of computer system readable media. Such media is any available media for the computer device 12 and includes both volatile and non-volatile media, removable and non-removable media.

The system memory 28 includes computer system readable media in the form of volatile memory, such as a random access memory (RAM) 30 and/or a cache memory 32. The computer device 12 further includes other removable/non-removable, volatile/non-volatile computer system storage media. For example, a storage system 34 is configured to read and write non-removable, nonvolatile magnetic media (not shown in FIG. 9 and commonly referred to as a "hard drive"). Although not shown in FIG. 9, a magnetic disk drive for reading and writing to a removable, non-volatile magnetic disk (e.g., a "floppy disk") and an optical disk drive for reading or writing to a removable, non-volatile optical disk (e.g., a CD-ROM, DVD-ROM, or other optical media) is provided. In these cases, each drive is connected to the bus 18 by one or more data media interfaces. The memory 28 includes at least one program product having a group (e.g., at least one) of program modules that are configured to carry out functions of the embodiments of the present disclosure.

A program/utility 40 having a group (at least one) of program modules 42 is stored in the memory 28. The program modules 42 includes but not limited to an operating system, one or more application programs, other program modules, and program data, each of which or some combination of which includes an achievement of a network environment. The program module 42 generally executes functions and/or methods in the embodiments described in the present disclosure.

The computer device 12 also communicates with one or more external devices 14 (e.g., keyboard, pointing device, display 24), with one or more devices that enable a user to interact with the computer device 12, and/or with any devices (e.g., network card, modem) that enable the computer device 12 to communicate with one or more other computing devices. Such communication is performed via an input/output (I/O) interface 22. Moreover, the computer device 12 communicates with one or more networks (e.g., a local area network (LAN), a wide area network (WAN), and/or a public network, such as Internet) through a network adapter 20. As shown in the figure, the network adapter 20 communicates with other modules of the computer device 12 through the bus 18. It should be understood that, although not shown in the figure, other hardware and/or software modules are used in conjunction with the computer device 12, including but not limited to: a microcode, a device driver, a redundant processing unit, an external disk drive array, a RAID system, a tape drive, and a data backup storage system, and the like.

A processing unit 16 executes a variety of function applications and data processing by running a program stored in the system memory 28, such as achieving the method for training the isolation forests and the method for recognizing the web crawler according to the embodiments of the present disclosure.

Embodiments of the present disclosure further provide a non-volatile computer-readable storage medium, storing one or more computer programs, wherein the one or more computer programs, when loaded and run by a processor, causes the process or to perform the processes of the above method for training the isolation forests and the above method for recognizing the web crawler, and the same technical effect is achieved. To avoid repetition, it will not be repeated herein.

The non-volatile computer-readable storage medium includes, for example, but is not limited to, an electronic, magnetic, optical, electromagnetic, infrared, or semiconductor system, apparatus, or device, or any combination of the above. More specific examples (a non-exhaustive list) of the non-volatile computer-readable storage medium include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present document, a computer-readable storage medium is any tangible medium that contains, or store a program for use by or in combination with an instruction execution system, an apparatus, or a device. The computer-readable storage medium is a non-transitory computer-readable storage medium.

What is claimed is:

1. A method for training isolation forests, comprising:
   acquiring a plurality of categories by classifying uniform resource identifiers;

acquiring sample behavior data by monitoring a behavior of a client from each of Internet Protocol IP addresses in a plurality of IP addresses accessing the uniform resource identifiers under the plurality of categories;

encoding the sample behavior data as a sample access vector; and training, based on the sample access vector, an isolation forest for recognizing a web crawler from the client;

wherein encoding the sample behavior data as the sample access vector comprises:

counting a quantity of uniform resource identifiers under each of the categories accessed by the client from each of the IP addresses in the sample behavior data; and acquiring the sample access vector of each of the IP addresses by respectively setting, with each of the categories as a dimension of the vector, a plurality of quantities corresponding to the plurality of categories as values of a plurality of dimensions corresponding to the plurality of categories in the vector.

2. The method according to claim 1, wherein acquiring the plurality of categories by classifying the uniform resource identifiers comprises:

determining functions of the uniform resource identifiers; and organizing the uniform resource identifiers implementing a same function into one category.

3. The method according to claim 2, wherein determining the functions of the uniform resource identifiers comprises:

segmenting the uniform resource identifier into a plurality of fields with a slash as a segmentation point;

extracting a field representing a domain name, a module and a method as a target field; and determining that the target field represents a function of the uniform resource identifier.

4. The method according to claim 1, wherein training, based on the sample access vector, the isolation forest for recognizing the web crawler from the client comprises:

determining a metric for distinguishing the web crawler; and acquiring the isolation forest by generating, under the metric, a plurality of isolation trees using a portion of the sample access vectors multiple times.

5. The method according to claim 4, wherein determining the metric for distinguishing the web crawler comprises at least one of the following operations:

determining a quantity of accesses to the uniform resource identifiers as the metric for distinguishing the web crawler; and determining a quantity of accesses to all the uniform resource identifiers under the plurality of categories as the metric for distinguishing the web crawler.

6. The method according to claim 4, wherein each of isolation trees is a binary tree structure, each of the isolation trees comprises a plurality of nodes; and acquiring the isolation forest by generating, under the metric, the plurality of isolation trees using the portion of the sample access vectors multiple times comprises:

randomly extracting a portion of the sample access vectors as root nodes of the isolation tree;

determining whether a preset training condition is met, determining that training the isolation tree is complete in response to the preset training condition being met, and generating a cutting point in a cutting range of a current node in response to the preset training condition being not met, wherein the current node is initially the root node, and the cutting range is a range defined by values of the sample access vectors under the metric;

generating a first child node and a second child node with the current node as a father node; and in response to determining that a value of the sample access vector under the metric is smaller than the cutting point, adding the IP address to the first child node, or in response to determining that a value of the sample access vector under the metric is greater than or equal to the cutting point, adding the IP address to the second child node, and returning to determining whether the preset training condition is met.

7. The method according to claim 1, further comprising: reducing a dimension of the sample access vector.

8. The method according to claim 7, wherein reducing the dimension of the sample access vector comprises:

combining the sample access vectors into a matrix as a first sample access matrix, wherein the first sample access matrix comprises n rows of data;

performing zero averaging on each row of data in the first sample access matrix;

in response to determining that zero averaging is complete, calculating a sample covariance matrix for the first sample access matrix;

calculating sample eigenvalues and sample eigenvectors of the sample covariance matrix;

arranging the sample eigenvectors in rows from top to bottom according to a magnitude of the sample eigenvalue, and taking first k row(s) to form a second sample access matrix; and acquiring a sample access vector upon reducing the dimension by calculating a product between the second sample access matrix and the first sample access matrix;

wherein n is a positive integer, and n>1, k is a positive integer, and $1 \le k \le n$.

9. A method for recognizing a web crawler, comprising:

acquiring target behavior data by monitoring a behavior of a client from each of IP addresses in a plurality of Internet Protocol IP addresses accessing uniform resource identifiers under a plurality of categories;

encoding the target behavior data as a target access vector; and determining an isolation forest for recognizing a web crawler from the client, wherein the isolation forest is acquired by a method for training isolation forests;

recognizing an abnormal IP address by inputting the target access vector into the isolation forest; and determining that the client from the abnormal IP address is the web crawler;

wherein the method for training the isolation forests comprises:

acquiring a plurality of categories by classifying uniform resource identifiers;

acquiring sample behavior data by monitoring a behavior of a client from each of Internet Protocol IP addresses in a plurality of IP addresses accessing the uniform resource identifiers under the plurality of categories;

encoding the sample behavior data as a sample access vector; and training, based on the sample access vector, an isolation forest for recognizing a web crawler from the client.

10. The method according to claim 9, wherein the isolation forest comprises a plurality of isolation trees, and recognizing the abnormal IP address by inputting the target access vector into the isolation forest comprises:

calculating an abnormal value of each of the IP addresses by traversing each of the isolation trees in the isolation forest based on the target access vector; and in response to determining that the abnormal value is greater than a preset threshold, determining an IP address corresponding to the abnormal value as the abnormal IP address.

11. The method according to claim 10, wherein each of the isolation tree comprises a plurality of nodes; and calculating the abnormal value of each of the IP addresses by traversing each of the isolation trees in the isolation forest based on the target access vector comprises:

in each of the isolation trees, adding each of the IP addresses to a root node of the isolation tree;
determining a metric for distinguishing the web crawler;
querying a cutting point of a current node, wherein the current node is initially the root node;
in response to determining that a value of the target access vector under the metric is less than the cutting point, adding an IP address to a first child node under the current node, or in response to determining that a value of the target access vector under the metric is greater than or equal to the cutting point, adding an IP address to a second child node under the current node, and returning to querying the cutting point of the current node; and
in response to determining that the target access vector completes traversing each of the isolation trees, calculating an abnormal value of each of the IP addresses based on a height of each of the IP addresses in all the isolation trees.

12. The method according to claim 9, wherein encoding the target behavior data as the target access vector comprises:

in response to a period of time for accumulating the target behavior data exceeding a preset first threshold, encoding the target behavior data as the target access vector; or
in response to determining that a quantity of the uniform resource identifiers accessed by the client from the IP address in the target behavior data exceeds a preset second threshold, encoding the target behavior data as the target access vector.

13. A computer device for training isolation forests, comprising:

one or more processors; and
a memory, configured to store one or more programs;
wherein the one or more programs, when loaded and run by the one or more processors, cause the one or more processors to perform the method for training the isolation forests as defined in claim 1.

14. A non-transitory computer-readable storage medium storing one or more computer programs, wherein the one or more computer programs, when loaded and run by a processor, causes the processor to perform the method for training the isolation forests as defined in claim 1.

15. A computer device for recognizing a web crawler, comprising:

one or more processors; and
a memory, configured to store one or more programs;
wherein the one or more programs, when loaded and run by the one or more processors, cause the one or more processors to perform the method for recognizing the web crawler as defined in claim 9.

16. A non-transitory computer-readable storage medium storing one or more computer programs, wherein the one or more computer programs, when loaded and run by a processor, causes the processor to perform the method for recognizing the web crawler as defined in claim 9.

17. The method according to claim 9, wherein acquiring the plurality of categories by classifying the uniform resource identifiers to comprises:

determining functions of the uniform resource identifiers; and
organizing the uniform resource identifiers implementing a same function into one category.

18. The method according to claim 17, wherein determining the function of the uniform resource identifier comprises:

segmenting the uniform resource identifier into a plurality of fields with a slash as a segmentation point;
extracting a field representing a domain name, a module and a method as a target field; and
determining that the target field represents a function of the uniform resource identifier.

19. The method according to claim 9, wherein encoding the sample behavior data as the sample access vector comprises:

counting a quantity of uniform resource identifiers under each of the categories accessed by the client from each of the IP addresses in the sample behavior data; and
acquiring the sample access vector of each of the IP addresses by respectively setting, with each of the categories as a dimension of the vector, a plurality of quantities corresponding to the plurality of categories as values of a plurality of dimensions corresponding to the plurality of categories in the vector.

* * * * *